(12) United States Patent
Laur et al.

(10) Patent No.: US 8,487,593 B2
(45) Date of Patent: Jul. 16, 2013

(54) SYSTEM AND METHOD FOR DETECTION AND COMPENSATION OF AGGRESSIVE OUTPUT FILTERS FOR SWITCHED MODE POWER SUPPLIES

(75) Inventors: Steven P. Laur, Raleigh, NC (US); Rhys S. A. Philbrick, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 401 days.

(21) Appl. No.: 12/894,395

(22) Filed: Sep. 30, 2010

(65) Prior Publication Data

US 2011/0260703 A1 Oct. 27, 2011

Related U.S. Application Data

(60) Provisional application No. 61/326,894, filed on Apr. 22, 2010.

(51) Int. Cl.
*G05F 1/565* (2006.01)
*H02M 1/14* (2006.01)

(52) U.S. Cl.
USPC .......................... 323/217; 323/286; 323/288

(58) Field of Classification Search
USPC ................................. 323/217, 282, 284–288
See application file for complete search history.

(56) References Cited

U.S. PATENT DOCUMENTS

| | | | | |
|---|---|---|---|---|
| 4,298,924 A * | 11/1981 | Genuit | | 363/46 |
| 5,956,239 A * | 9/1999 | Giacomini | | 363/17 |
| 6,583,609 B1 * | 6/2003 | Pardoen | | 323/283 |
| 7,023,182 B1 * | 4/2006 | Kleine et al. | | 323/212 |
| 7,714,547 B2 * | 5/2010 | Fogg et al. | | 323/224 |
| 2006/0043943 A1 * | 3/2006 | Huang et al. | | 323/222 |
| 2006/0284609 A1 * | 12/2006 | Weng et al. | | 323/286 |
| 2007/0001655 A1 * | 1/2007 | Schiff | | 323/246 |
| 2008/0129264 A1 * | 6/2008 | Moussaoui et al. | | 323/283 |
| 2011/0316508 A1 * | 12/2011 | Cheng et al. | | 323/282 |
| 2012/0081094 A1 * | 4/2012 | Luo et al. | | 323/284 |

FOREIGN PATENT DOCUMENTS

JP 2004304873 10/2004

OTHER PUBLICATIONS

"10A EcoSpeed™ Integrated FET Regulator with Programmable LDO." Semtech Corporation. SC417/SC427 May 20, 2010.
Ni, Chuan et al. "Adaptive Constant On-Time (D-CAPTM) Control Study in Notebook Applications." PMP—Systems Power Application Report. Texas Instruments. SLVA281B—Jul. 2007—Revised Dec. 2007. pp. 1-9.
"Single Synchronous Step-Down Controller." Texas Instruments. SLVS631B—Dec. 2005—Revised Sep. 2009. pp. 1-30.

* cited by examiner

*Primary Examiner* — Adolf Berhane
*Assistant Examiner* — Fred E Finch, III
(74) *Attorney, Agent, or Firm* — Gary Stanford

(57) ABSTRACT

A controller for a switched mode power supply converting an input voltage to a regulated output voltage according to one embodiment includes a control network and a detection network. The control network develops a pulse width control signal for regulating a level of the output voltage. The detection network detects a phase lag of the output voltage and adjusts operation of the control network based on the phase lag. The phase lag may be determined from any parameter incorporating phase shift, such as the output voltage or the compensation voltage. Various alternative schemes are disclosed for adjusting the control loop, including, but not limited to, adding slope compensation, adjusting window resistance or window current, adding adjustment current to adjust ripple voltage, adjusting ripple transconductance, and adjusting ripple capacitance. Digital and analog compensation adjustment schemes are disclosed.

25 Claims, 9 Drawing Sheets

# SYSTEM AND METHOD FOR DETECTION AND COMPENSATION OF AGGRESSIVE OUTPUT FILTERS FOR SWITCHED MODE POWER SUPPLIES

CROSS-REFERENCE TO RELATED APPLICATIONS

This application claims the benefit of U.S. Provisional Application Ser. No. 61/326,894, filed on Apr. 22, 2010, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings where.

DETAILED DESCRIPTION

Figure 1:
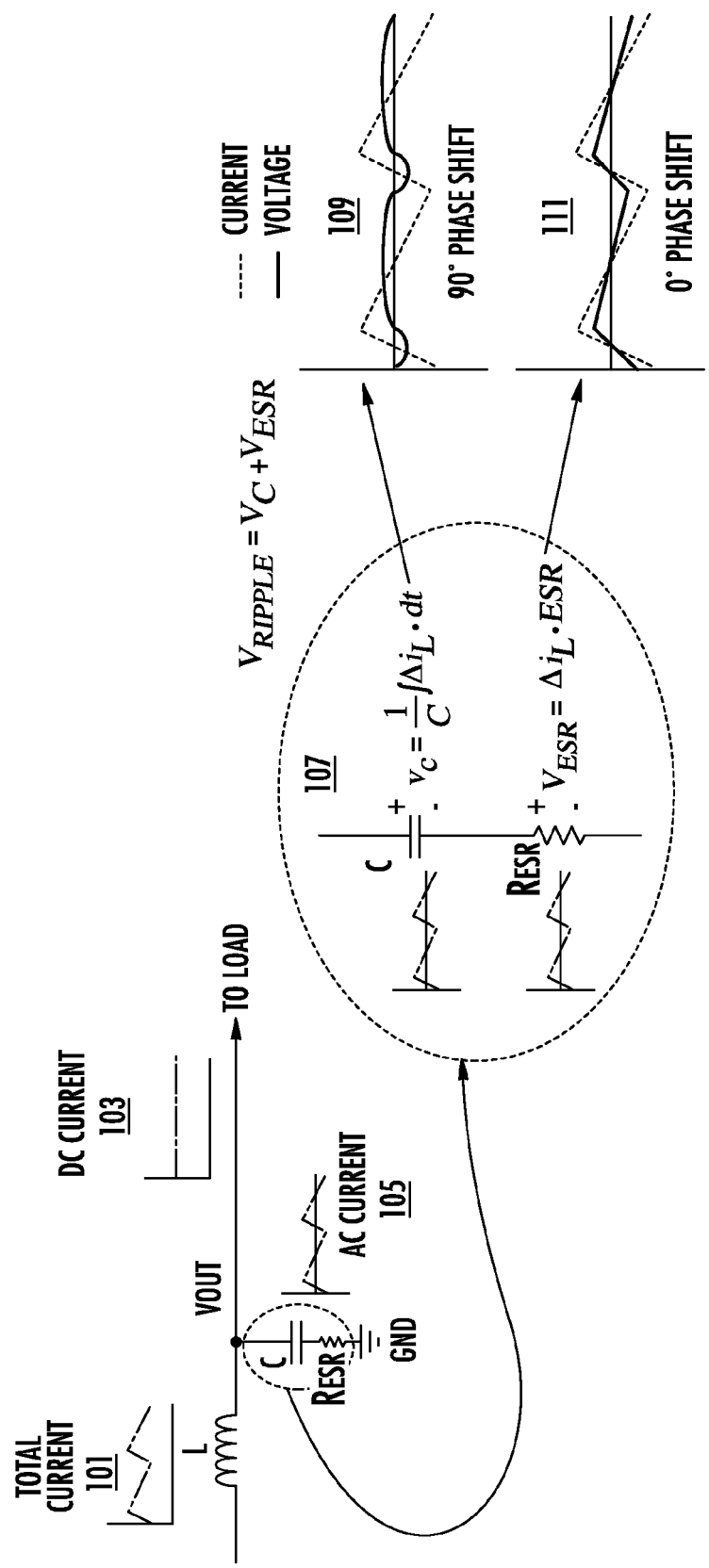
FIG. 1 is a partial schematic and graphic depiction illustrating the output voltage ripple at the output of a switched-mode power supply.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Many control schemes are known for switched mode power supplies, including, for example, hysteretic control schemes. Hysteretic control schemes have many varieties, including, for example, various synthetic ripple modes, voltage-modes, current-modes, and constant on-time modes, among others. Hysteretic control schemes are usually advantageous because of their ease of use and fast transient response. They generally need little or no compensation by the power supply designer to achieve a stable system. This is true for a wide range of output filters. Hysteretic control schemes, however, have inherent stability limitations as a function of the amount of output voltage phase shift, or phase lag, due to aggressive output filter design. An aggressive filter is generally characterized by low values of output inductance and/or a low output capacitance with low output capacitor equivalent series resistance (ESR). The phase lag, if large enough, may cause output voltage oscillation and double-pulsing. In conventional configurations, when it was intended to use very aggressive filters, the control scheme usually had to be augmented to maintain stability. Such augmentation usually meant a full redesign of the power supply at a board level and often at the silicon level to accommodate the possible range of output filters. The difficulty with these conventional approaches is that the introduction of a stabilizing element impeded transient performance, which is the main goal of using hysteretic control.

The present disclosure describes a system and method for detecting whether or not an output filter is too aggressive and for automatically compensating the control loop to maintain stability. A system and method as described herein detects phase shift or phase lag indicating the presence of an aggressive, destabilizing output filter, and determines whether or not to adjust or modify the control loop compensation. Automatic detection may be performed by sensing phase lag incorporated within any voltage or current within the system, such as output voltage or compensation voltage, or the like. Automatic compensation may be performed in any one of several manners, such as by adjusting a control loop characteristic, variable, or parameter, or adjusting a control loop element, adding a stabilizing element in the control loop, or any combination of these compensation schemes. Automatic compensation may be performed using digital and/or analog methods as further described herein. Automatic detection and compensation allows for less aggressive output filters to maintain optimal transient performance when adjustment is not necessary or when a stabilizing element is not needed. Conversely, when stabilization is desired, the control loop is automatically modified so that no redesign is necessary by the power supply manufacturer or designer. Without the addition of "auto-tuning" or automatic detection and compensation as described herein, less aggressive output filter designs would have worse transient response to accommodate more aggressive output filter selections. With the addition of auto-tuning, the compensation for aggressive filters is only present when needed.

FIG. 1 is a partial schematic and graphic depiction illustrating the output voltage ripple at the output of a buck-type switched-mode power supply. The present invention is illustrated using buck-type regulators in which the input voltage is reduced to a regulated output at a lower voltage, although other types of regulators are contemplated, such as boost-type regulators (output voltage greater than input voltage) or combinations thereof. The power supply usually has an output inductor L coupled to an output capacitor C at an output node developing output voltage VOUT. A simplified graph at 101 depicts the total current through the output inductor L, a simplified graph at 103 depicts the DC current provided to a load (not shown), and a simplified graph at 105 depicts the AC current across the capacitor C. The output capacitor C incorporates or otherwise inherently includes an equivalent series resistance (ESR), which is shown as a resistor $R_{ESR}$ coupled in series with the capacitor C between the output node and ground (GND). The capacitor C may also include an equivalent series inductance (ESL), which is relatively small so that the ESL effects may be ignored for purposes of the present disclosure.

As illustrated by the schematic and graphic depictions and by the equations shown at 107, 109 and 111, the output voltage ripple $v_{RIPPLE}$ is a product of two main sources, the AC current multiplied by the ESR of the capacitor C, and the 90° phase-shifted voltage generated by the pure capacitance in response to an AC current stimulus. It is noted that $v_{RIPPLE}$ is the AC portion of the output voltage VOUT. Equations (1), (2) and (3) governing the AC magnitudes of these two voltages are as follows:

$$v_{ESR} = i_{RIPPLE} * ESR \quad (1)$$

$$v_C = [\Delta i_L * T_S]/[8 * C_{OUT}] \quad (2)$$

$$v_{RIPPLE} = v_C + v_{ESR} \quad (3)$$

in which lower-case italicized variables i and v denote AC current and voltage values, respectively, and $C_{OUT}$ is the capacitance of the output capacitor C. Equations (1) and (2) govern the AC magnitude, whereas equation (3) describes the total capacitor voltage, magnitude and phase. As shown by equation (3), the total ripple $v_{Ripple}$ of the output voltage VOUT is the sum of the in-phase voltage $v_{ESR}$ and the 90° phase-shifted voltage $v_C$.

Figure 2:
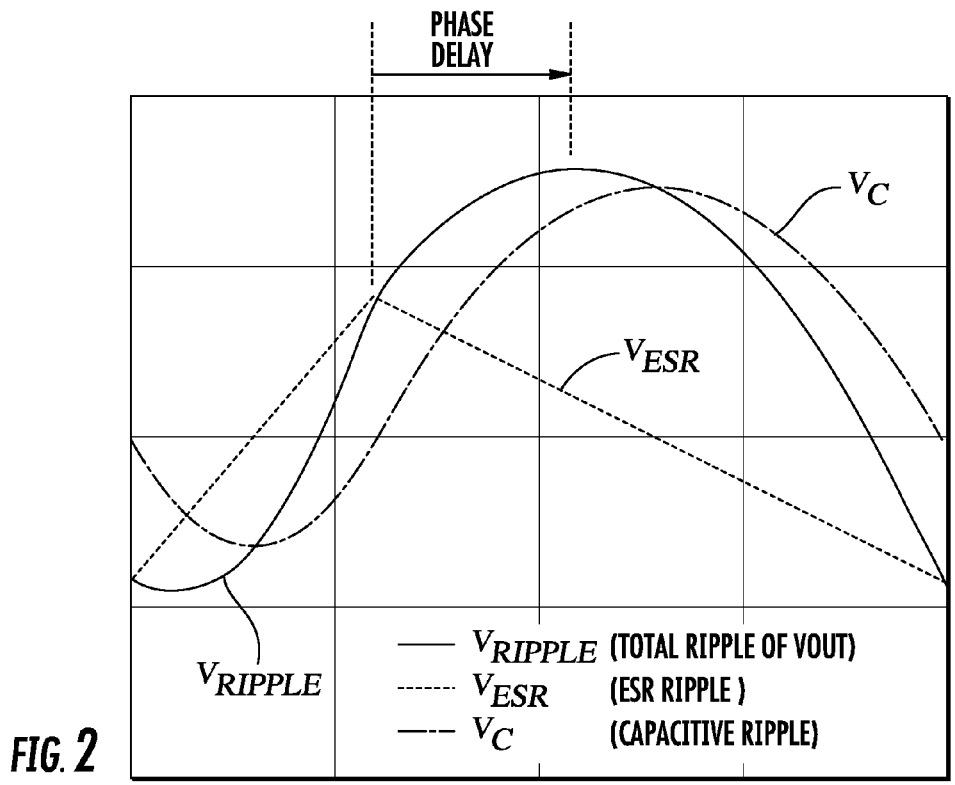
FIG. 2 is a graphic diagram plotting output voltage ripple, the in-phase voltage and the 90° phase-shifted voltage of the output voltage of the switched-mode power supply.

FIG. 2 is a graphic diagram plotting the output voltage ripple $v_{RIPPLE}$ of the output voltage VOUT, the in-phase voltage $v_{ESR}$ and the 90° phase-shifted voltage $v_C$. As stated by equation (3), $v_{RIPPLE}$ is the sum of $v_C$ and $v_{ESR}$. When the capacitance $C_{OUT}$ of the output capacitor C is large, such that ESR is also correspondingly large, the in-phase voltage with zero phase shift $v_{ESR}$ dominates so that the output voltage ripple $v_{RIPPLE}$ is closer to zero degrees thus exhibiting a relatively low amount of phase shift. As capacitance $C_{OUT}$ and ESR are made smaller for more aggressive filter designs, however, the 90° phase-shifted voltage $v_C$ increases and tends to dominate over the $v_{ESR}$ value so that the total phase of $v_{RIPPLE}$ moves away from 0° towards 90° as shown in FIG. 2.

Hysteretic controllers, which are inherently stable (i.e., which need little or no compensation), can become destabilized when the phase shift on the output voltage VOUT becomes too large. For example, the following equation (4) dictates the minimum allowable ESR for a constant on-time regulator without adding slope compensation:

$$[F_{SW}/\pi] = 1/[2 * \pi * C_{OUT} * ESR] \quad (4)$$

Equation (4) shows that output capacitor zero frequency should be less than approximately $\frac{1}{3}^{rd}$ the switching frequency $F_{SW}$. This limits the bandwidth of the regulator (switched mode power supply) and prevents the use of all-ceramic output filters typically used in aggressive output filter configurations. The aggressive output filter may be compensated for by introducing a ramp to add in-phase voltage information, which may be referred to as slope compensation. The permanent addition of slope compensation, however, hinders transient response regardless of which output filter is used.

Figure 3:
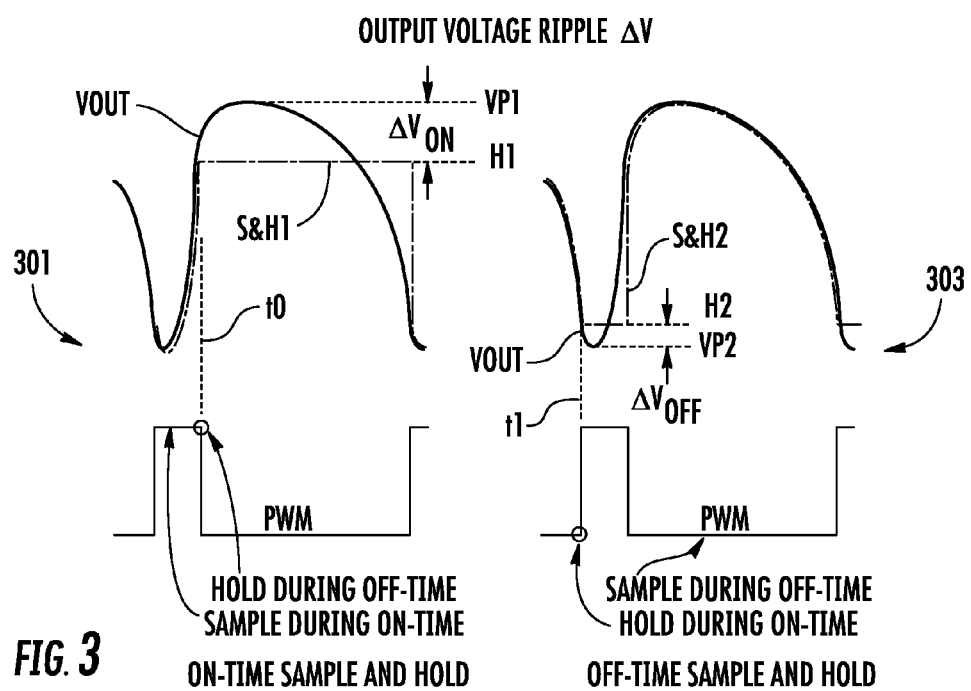
FIG. 3 is a graphic diagram illustrating sampling of the output voltage at an operative edge of a pulse width modulation (PWM) control signal generated by the regulator to control the voltage level of the output voltage.

FIG. 3 is a graphic diagram illustrating sampling of VOUT at an operative edge of a pulse width modulation (PWM) control signal generated by the regulator to control the voltage level of VOUT. As illustrated by FIG. 3, if VOUT is sampled and held at each PWM transition, VOUT can be compared against the held value resulting in a $\Delta V$ value. For on-time sample and hold, the difference is $\Delta V_{ON}$, and for off-time sample and hold, the difference is $\Delta V_{OFF}$. More specifically, as shown by a first pair of graphs on the left at 301, VOUT is continuously sampled while PWM is high (sample during on-time of PWM) and then the sampled voltage is held at the time t0 when PWM goes low (hold during off-time of PWM). Thus, the "operative edge" for this case is when PWM transitions from high to low. This results in a first sample and hold signal S&H1 which follows VOUT while PWM is high and which is held at a fixed level H1 when PWM goes low at time t0. When the phase shift is large, VOUT continues to rise to a peak level VP1 after the PWM signal has gone low resulting in a difference of $\Delta V_{ON} = VP1 - H1$. As shown by a second pair of graphs on the right at 303, VOUT is sampled (alternatively, or in addition) while PWM is low (sample during off-time of PWM) and then the sampled voltage is held at the time t1 when PWM goes high (hold during on-time of PWM). Thus, the "operative edge" for this case is when PWM transitions from low to high. This results in a second sample and hold signal S&H2 which follows VOUT while PWM is low and which is held at a fixed level H2 when PWM goes low at time t0. In this case, when the phase shift becomes large, VOUT continues to fall to a minimum peak level VP2 after the PWM signal goes high resulting in a difference of $\Delta V_{OFF} = H2 - VP2$. A detection method as described herein detects either one or both $\Delta V_{ON}$ and $\Delta V_{OFF}$ for detecting the level of phase shift. For detection both $\Delta V_{ON}$ and $\Delta V_{OFF}$ in the same PWM cycle, the sampled value is held sufficiently long after a PWM edge while VOUT reaches its maximum overshoot amount, and then sampling is initiated again for the following edge of PWM in the opposite direction. Thus, either one or both of $\Delta V_{ON}$ and $\Delta V_{OFF}$ may be used to measure the amount of phase shift of the output voltage. Once the phase shift is detected, there many different ways to compensate the system to ensure proper operation.

Figure 4:
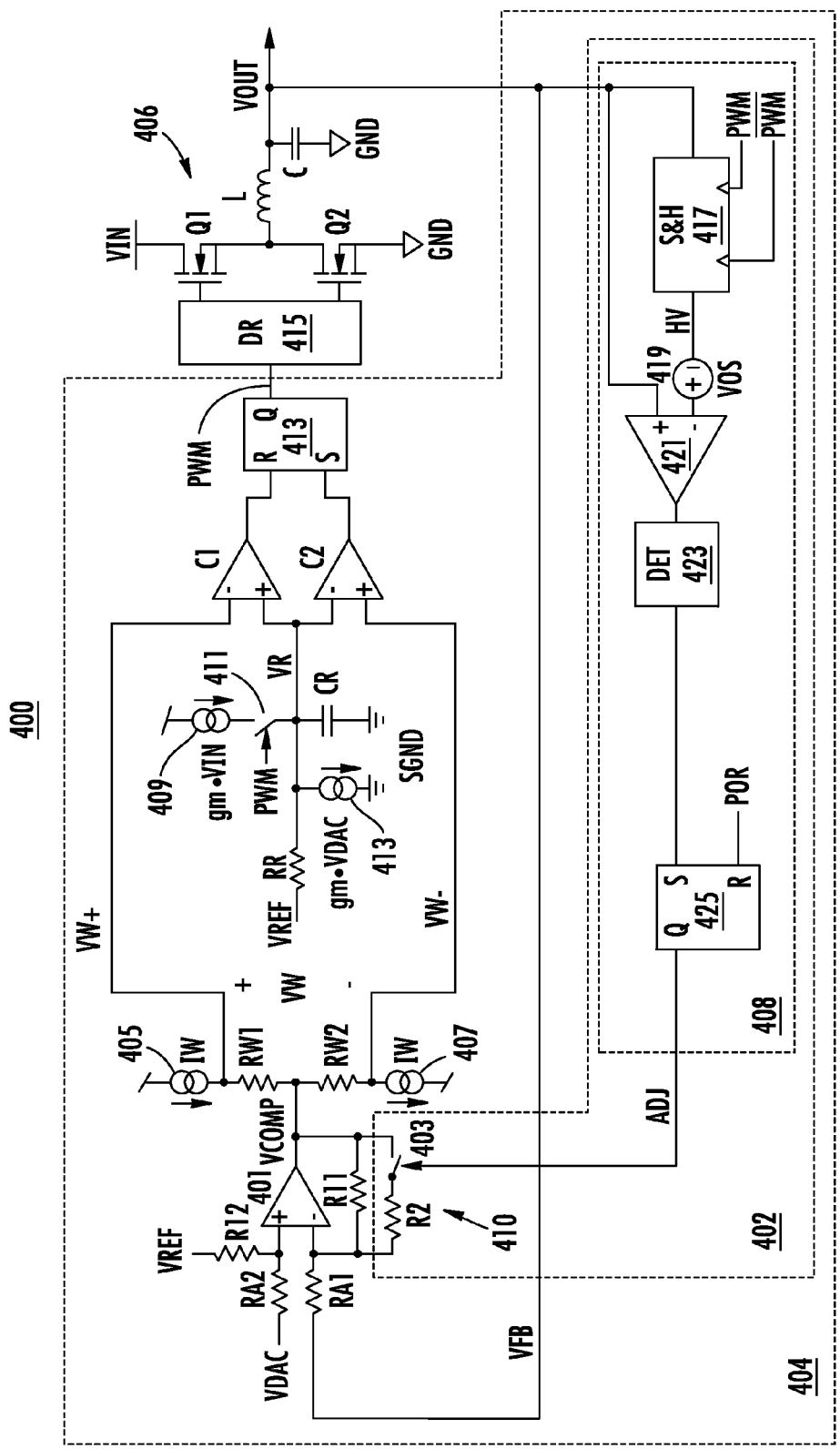
FIG. 4 is a schematic and block diagram of a synthetic ripple regulator in which the gain of an error amplifier is changed to compensate for the phase lag using a digital compensation adjust implementation.

FIG. 4 is a schematic and block diagram of a synthetic ripple regulator 400 in which the gain of an error amplifier 401 is changed to compensate for the phase lag using a digital compensation adjust implementation. In one embodiment, the synthetic ripple regulator 400 includes a switching network 406 which converts an input voltage VIN to the output voltage VOUT as controlled by the PWM signal provided by a controller 404. In one embodiment, the controller 404 is provided on a separate integrated network (IC) or semiconductor chip or the like for controlling operation of the external switching network 406. VOUT is sensed as a feedback voltage VFB provided to an input of the error amplifier 401 within the controller 404. Although VFB is shown directly coupled to VOUT, VFB may be a proportional value of VOUT, such as sensing VOUT via a corresponding voltage divider (not shown) or the like. VFB is provided to one end of a resistor RA1, having its other end coupled to the inverting (−) input of the error amplifier 401 and to one end of a gain resistor R11. A voltage VDAC indicative of the desired level of VOUT is provided to one end of another resistor RA2, having its other end coupled to the non-inverting (+) input of the error amplifier 401 and to one end of another resistor R12. The other end of the second resistor R12 receives a reference voltage VREF.

In the illustrated embodiment, resistors RA1 and RA2 generally have the same resistance as each other, and the resistors R11 and R12 also generally have the same resistance as each other, although alternative configurations are contemplated. The other end of the gain resistor R11 is coupled to the output of the error amplifier 401, which develops a compensation voltage VCOMP indicative of the level of error of the voltage level of VOUT.

VCOMP is provided to the intermediate junction of a pair of window resistors RW1 and RW2. RW1 and RW2 may have the same values for a balanced window configuration, although different values are contemplated. A current source 405 provides a window current IW into the other end of RW1 at a node which develops a positive window voltage VW+. A current sink 407 draws a window current IW from the other end of RW2 which develops a negative window voltage VW−. The voltage difference between VW+ and VW− is a window voltage VW as shown. VW+ is provided to the inverting input of a first comparator C1 and VW− is provided to the non-inverting input of another comparator C2. The non-inverting input of the comparator C1 and the inverting input of the comparator C2 are both coupled together at a ripple node developing a ripple voltage VR. The output of the comparator C1 is provided to the reset R input of an S-R flip-flop (SRFF) 413 and the output of the comparator C2 is provided to the set S input of the SRFF 413. The Q output of the SRFF 413 develops the PWM signal, which is provided at an output of the controller 404.

The PWM signal from the controller 404 is provided to an input of a driver module 415 of the switch network 406. The driver module 415 has a first output driving the gate of a first (or upper) electronic switch Q1 and has a second output driving the gate of a second (or lower) electronic switch Q2. The drain of Q1 receives the input voltage VIN and its source is coupled to the drain of Q2 at a phase node. The source of Q2 is coupled to GND, and the phase node is coupled to one end of an output inductor L, having its other end coupled to the output node developing the output voltage VOUT. The electronic switches Q1 and Q2 are shown as N-channel metal-oxide semiconductor, field-effect transistors (MOSFETs). Other types of power switch technologies are contemplated, such as suitable N-type or P-type transistors or devices including junction gate field-effect transistors (JFETs) and the like, Gallium Nitride (GaN) devices, etc. The driver module 415 is configured to properly drive the selected type of electronic switches. The output capacitor C is coupled between the output node and GND for filtering VOUT. The output capacitor C has a capacitance $C_{OUT}$ and an ESR as previously described.

Within the controller 404, VREF is provided to one end of a ripple resistor RR, having its other end coupled to the ripple node developing the ripple voltage VR. A ripple capacitor CR is coupled between the ripple node and a signal GND (SGND). A current source 409 sources a VIN proportional current gm·VIN provided to one terminal of a switch 411, having a second terminal coupled to the ripple node. The switch is illustrated as a single-pole, single-throw (SWST) switch having a control input receiving the PWM signal. The switch 411 is open when PWM is low and is closed when PWM is high. A current sink 413 sinks a VOUT proportional current gm·VDAC from the ripple node. The gain value "gm" represents a transconductance gain for multiplying the input voltage VIN or the output voltage VOUT for developing corresponding proportional current levels for charging and discharging the ripple capacitor CR as further described herein in accordance with synthetic ripple regulation.

Synthetic ripple regulation is a method of synthetically generating a ripple voltage indicative of the ripple current through the output inductor L rather than by direct or indirect measurement. As understood by those of ordinary skill in the art, the current waveform through a voltage-driven inductor is similar to the voltage waveform across a current-driven capacitor. Thus, driving a "ripple" capacitor (e.g., CR) with a current proportional to the voltage across the output inductor (e.g., L) provides the desired waveform shape. The voltage of the phase node applied at one end of output inductor L, for example, is generally the input voltage VIN when Q1 is on and Q2 is off (when PWM is high), and is zero or a reference level (e.g., SGND) when Q2 is on and Q1 is off. The current source 409 generates the VIN proportional current gm·VIN, which is applied to capacitor CR when PWM is high closing switch 411. When PWM is low opening switch 411, this current is removed from capacitor CR. The voltage of the output node at the other end of L is VOUT. The current sink 413 generates the VOUT proportional current gm·VDAC, which is continuously applied to discharge capacitor CR. It is noted that VDAC is the target level of VOUT and thus represents VOUT for purposes of synthetic ripple regulation. In this manner, the ripple capacitor CR is driven with a collective current which is proportional to the voltage applied across the output inductor L, so that the ripple voltage VR develops the desired ripple waveform shape. Thus, the ripple voltage VR effectively replicates the waveform ripple current through the output inductor L, and VR is used to control toggling of the PWM signal controlling the switching operation of the switching network 406.

In normal operation of the regulator 400 while temporarily ignoring the effects of the output capacitor C, VCOMP develops a voltage indicative of the relative error of VOUT relative to a target voltage level (e.g., as indicated by VDAC). The window voltage VW remains relatively constant yet "floats" up and down with changes of VCOMP. When PWM is high, the driver module 415 turns Q1 on and Q2 off so that VIN is coupled to L and the switch 411 is closed. The ripple voltage rises at a constant rate as determined by the current devices 409 and 413. When VR rises to VW+, the comparator C1 switches and resets the SRFF 413 which pulls PWM low. The driver module 415 turns Q1 off and Q2 on to couple the output inductor to GND, and the switch 411 is opened. The ripple voltage VR falls at a constant rate as determined by the current sink 413 since the current source 409 is disconnected by the switch 411. When the voltage of VR falls to VW−, the comparator C2 switches to set the SRFF 413 to pull PWM high once again. Operation repeats in this manner so that the regulator 400 attempts to regulate the voltage level of VOUT.

The controller 404 includes an automatic detection and compensation network 402 for adjusting the gain of the error amplifier 401 based on phase shift (a.k.a., phase lag) of VOUT. The detection and compensation network 402 includes a detection network 408 for detecting phase lag and a compensation network 410 responsive to the detection network 408 for compensation the control loop. The compensation network 410 includes another gain resistor R2 and a switch 403 which are coupled in series with each other across the gain resistor R11. When the switch 403 is open, the gain of the amplifier 401 is determined by R11. When the switch 403 is closed, the additional gain resistor R2 is effectively placed in parallel with R11 to reduce feedback gain resistance and thus to modify (e.g., reduce) the gain. The detection network 402 further includes a sample and hold module 417, an offset voltage source 419, a comparator 421, a detection module 423, and an SRFF 425. The sample and hold module 417 has an input receiving VOUT and an output developing a hold voltage HV which is provided to the negative terminal of the offset voltage source 419. The offset voltage source 419 develops an offset voltage VOS and has its positive terminal coupled to the inverting input of the comparator 421, which has a non-inverting input receiving VOUT. The offset voltage VOS may be positive or negative depending upon whether a positive overshoot (e.g., $\Delta V_{ON}$) or a negative overshoot (e.g., $\Delta V_{OFF}$) is being determined. The positive terminal or output of the offset voltage source 419 provides a threshold voltage which is compared with VOUT by the comparator 421. The output of the comparator 421 is coupled to an input of the detection module 423, having an output coupled to the set input of the SRFF 425. The Q output of the SRFF 425 develops an adjust signal ADJ which is provided to the control input of the switch 403. The PWM signal is provided to one clock input of the sample and hold module 417, which has another clock input receiving an inverted version of PWM, shown with an overstrike indicating an inverted signal. A power-on, reset (POR) signal is provided to the reset input of the SRFF 425.

In operation, upon any power-on or reset event of the regulator 400, the POR signal resets the SRFF 425 pulling the ADJ signal low opening the switch 403. The gain resistor R11 is designed for suitable operation with a less aggressive output filter (e.g., higher value of $C_{OUT}$) so that operation of the regulator 400 is in accordance with normal operation previously described. As the PWM signal becomes active, VOUT is sampled by the sample and hold module 417 upon operative edges of PWM to develop the sampled voltage SV at its output. As previously described with reference to FIG. 3, VOUT is sampled at the falling edge of PWM, or at the rising edge of PWM, or at both edges depending upon the particular configuration. The hold voltage HV corresponds to either H1 or H2 or both in FIG. 3. If VOUT is monitored at both edges of PWM, then the sample and hold module 417 holds HV valid sufficiently long to measure overshoot of VOUT, and then returns to sample mode prior to the next edge of PWM in order to accurately measure both $\Delta V_{ON}$ and $\Delta V_{OFF}$. Also, VOS is positive for adding the offset voltage to HV for measuring $\Delta V_{ON}$ when PWM goes low, and is negative for subtracting the offset voltage from HV for measuring $\Delta V_{OFF}$ when PWM goes high (or VOS is added or subtracted depending upon the particular implementation) for determining the threshold voltage. Alternatively, a separate sample and hold and comparator network (not shown) may be provided, so that a first sample and hold and comparator network determines $\Delta V_{ON}$ and a second sample and hold and comparator network determines $\Delta V_{OFF}$ using separate threshold voltages. It is understood that the detection and compensation network 402 shown in FIG. 4 is simplified for illustrating the principles of measuring phase lag of VOUT. When the output filter is not sufficiently aggressive, then $\Delta V_{ON}$ and/or $\Delta V_{OFF}$ does not exceed the threshold voltage (e.g., HV+VOS<VOUT in which VOS is positive for positive edges of PWM, or VOS is negative for negative edges of PWM) during operation, so that the comparator 421 does not trigger. Thus, ADJ remains low and the gain of the error amplifier 401 is determined by the gain resistor R11.

When the output filter is aggressive such that VOUT rises above (or falls below) the threshold voltage (combination of HV and VOS) during operation, then the comparator 421 triggers as detected by the detection module 423. The offset voltage VOS represents any suitable offset voltage indicative of the relative phase shift of VOUT. The amount of phase shift of VOUT is based on the aggressiveness of the output filter as previously described. The detection module 423 may be configured according to any one or more of several different embodiments. In one embodiment, the detection module 423 is not provided or is simply a pass-through module such that any trigger event by the comparator 421 sets the SRFF 425 and pulls ADJ high. In another embodiment, the detection module 423 is configured as a filter and/or delay for filtering out any spurious noise at the output of the comparator 421 to ensure proper detection of actual triggering events. In addition, or in the alternative, the detection module 423 includes a counter which counts the number of trigger events by the comparator 421. When the number of trigger events of the comparator 421 reaches a predetermined minimum number of events (e.g. 10 or 100 or 1,000, etc.), the detection module 423 sets the SRFF 425 to assert the ADJ signal to close the switch 403.

When the switch 403 is closed, the additional gain resistor R2 is placed in parallel with the gain resistor R11 to modify (e.g., reduce) the gain of the error amplifier 401. The resistive value of the resistor R2 is selected to combine with the resistance of R11 to achieve a suitable or desired gain of the error amplifier 401 to ensure proper operation for an aggressive output filter, such as a relatively small capacitance $C_{OUT}$ and ESR of the output capacitor C, or an all-ceramic type capacitor C, etc. Although transient response may be somewhat reduced, the modification of control loop operation adds in-phase information to compensate the system for phase lag of the output voltage.

Figure 5:
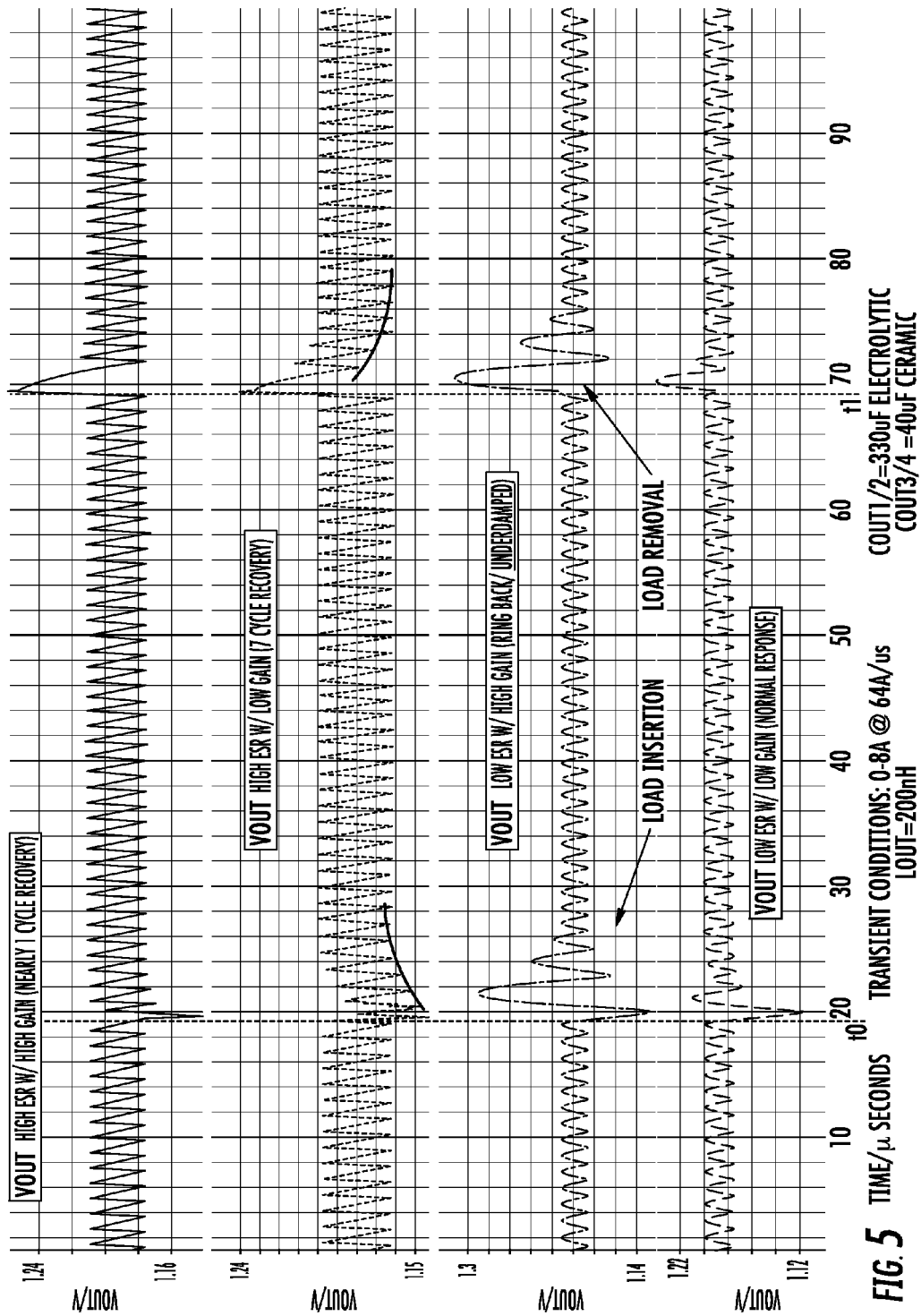
FIG. 5 is a series of simulated graph diagrams showing the effect of changing the gain of the error amplifier in the regulator of FIG. 4 in response to transient events.

FIG. 5 is a series of simulated graph diagrams showing the effect of changing the gain of the error amplifier 401 in the regulator 400 in response to transient events. A first transient event is insertion (or onset or application) of a load (load increase) at about a first time t0 and the second transient event is the removal of the load (load decrease) at about a time t1. The top graph plots VOUT with high ESR (less aggressive filter) using only the resistor R11 for normal gain (e.g., high gain). In this first case, there is relatively normal recovery and thus appropriate response by the regulator 400. The second graph plots VOUT with high ESR (less aggressive filter) when the gain is reduced by adding the resistor R2 in parallel with R11. In this second case, transient response suffers (e.g., longer recovery) because of insufficient gain. The detection and compensation network 402 is configured not to trigger in the high ESR case so that appropriate operation is maintained.

The third graph plots VOUT with low ESR (more aggressive filter) using only the resistor R11 for normal gain (e.g., high gain). In this third case, the regulator 400 exhibits undesirable ring back and under-damped response. In this manner, without the benefit of the detection and compensation network 402, the use of an aggressive output filter causes performance of the regulator to suffer with undesired results. A customer would be advised to either not use the aggressive output filter, or otherwise to use a modified regulator with increased cost to achieve desired results. In contrast, the fourth graph plots VOUT with low ESR (more aggressive filter) when the gain is reduced by adding the resistor R2 in parallel with R11. In this second case, a normal and sufficient response is achieved by decreasing the gain as compared to the third case. The detection network 408 is configured to trigger in the low ESR case so that appropriate operation is achieved for aggressive output filters. In summary, the detection and compensation network 402 automatically detects phase lag and applies compensation to the feedback control loop so that desired operation (e.g., as shown in plots 1 and 4 of FIG. 5) is achieved for a wide range of output filters (while avoiding undesired operation such as shown in plots 2 and 3 of FIG. 5).

Figure 6:
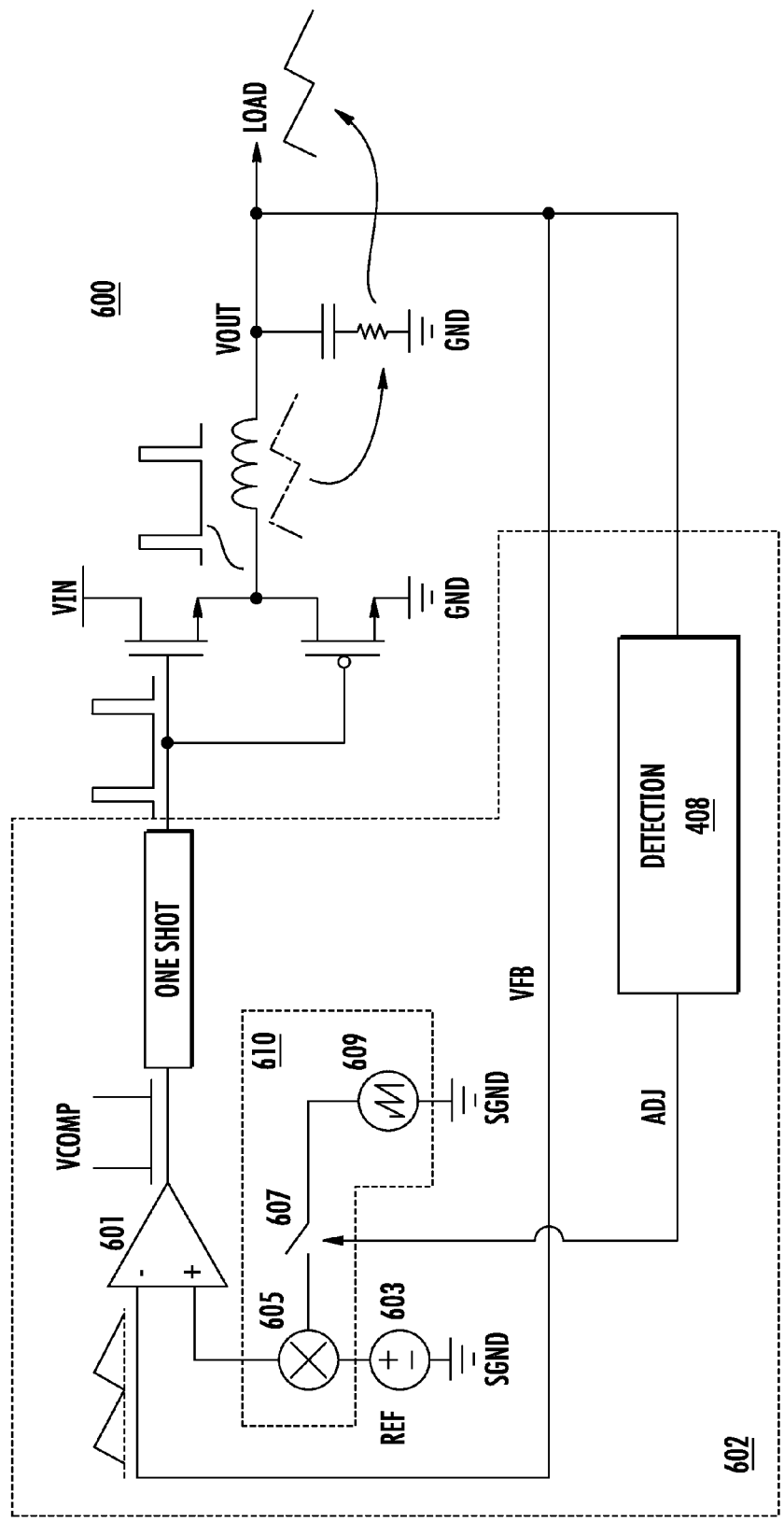
FIG. 6 is a simplified schematic and block diagram of a constant on-time regulator which is modified to incorporate the automatic compensation network of FIG. 4.

FIG. 6 is a simplified schematic and block diagram of a constant on-time regulator 600 which is modified to incorporate the detection network 408 and a compensation network 610. Constant on-time modulators may also benefit from dynamically adding ramp or "slope" compensation to compensate for aggressive output filters. The regulator 600 is a digital implementation similar to the regulator 400, and specific details of operation of the regulator 600 are not described since known and understood by those of ordinary skill in the art. The regulator 600 is a switched power supply for converting an input voltage VIN to an output voltage VOUT in a similar manner as described above for the regulator 400, although synthetic ripple regulation is not used for the regulator 600. The regulator 600 includes a controller 602, which may be implemented on a controller IC or chip or the like. The controller 602 for the regulator 600 includes an amplifier 601 having an inverting input receiving VFB indicative of VOUT, and a non-inverting input normally receiving a reference voltage REF from a voltage source 603. In this case, the compensation network 610 is included, which includes a combiner (e.g., adder) 605, a switch 607, and a slope compensation network 609. The REF voltage is provided to one input of the combiner 605, having another input coupled to one terminal of the switch 607. The other terminal of the switch 607 is coupled to the output of the slope compensation network 609 referenced to SGND. The switch 607 is similar to the switch 403 and is controlled by the ADJ signal received from the detection network 408 in a similar manner as previously described. Slope compensation may be used to add in-phase information into the control loop of the regulator 600. The detection network 408 controls the switch 607 via the ADJ signal for switching in/out the slope compensation network 609 based on the phase shift of VOUT. Thus, when the detection network 408 detects phase shift/lag of VOUT as previously described, it closes the switch 607 to add the slope compensation from the slope compensation network 609 for dynamically compensating for aggressive output filters. If a non-aggressive output filter is employed, the operation of the regulator 600 is otherwise not modified.

Figure 7:
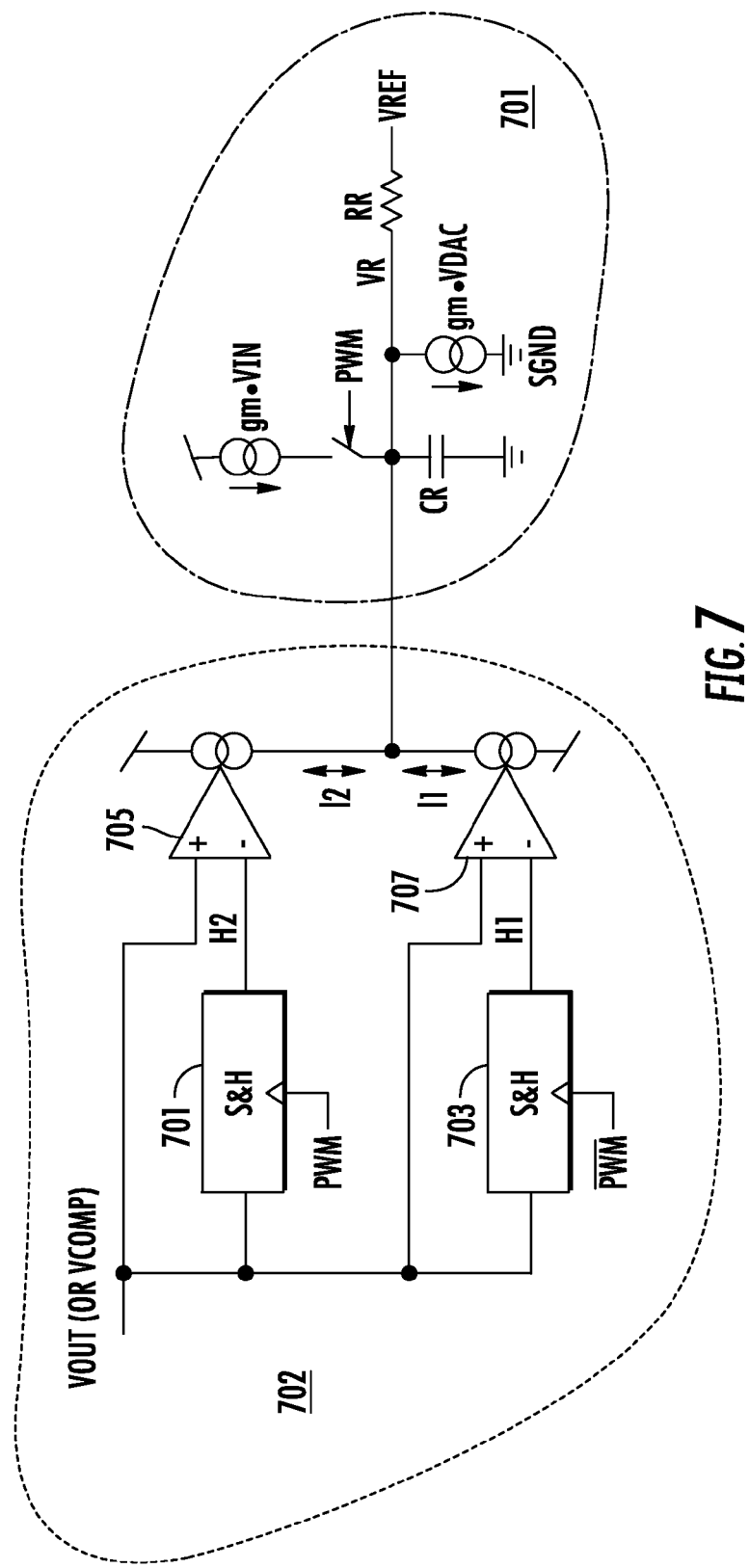
FIG. 7 is a schematic and block diagram of an analog compensation network using a transconductance network which develops adjust currents based on differences between sampled voltages and the output voltage.

Other implementations are contemplated beyond the few digital implementations described. One possible analog solution for synthetic ripple regulation is illustrated in FIG. 7 for compensating the controller portion 701. The controller portion 701 is substantially similar to the synthetic ripple regulation portion described for the regulator 400 and operates in substantially the same manner to develop a ripple voltage VR across a ripple capacitor CR. The detection and compensation network 402, however, is replaced by an automatic detection and compensation network 702, which is coupled to the ripple node for adjusting the ripple voltage VR rather than adjusting gain of an error amplifier within the control loop.

In this case, the difference between sampled voltage(s) and the output voltage VOUT is converted by a transconductance amplifier network into corresponding adjust current(s), which is/are then fed into the ripple capacitor CR via the ripple node. The detection and compensation network 702 includes two sample and hold modules 701 and 703. Sample and hold module 701 is clocked by PWM in a similar manner previously described for providing on-time sample H2 to a first transconductance amplifier 705. Sample and hold network 703 is clocked by an inverted version PWM for providing off-time sample H1 to second transconductance amplifier 707. The outputs of the transconductance amplifiers 705 and 707 are coupled together at the ripple node of the regulator portion 701 for adjusting VR. The output of the transconductance amplifier 707 develops a first adjust current I1 and the output of the transconductance amplifier 705 develops a second adjust current I2. The adjust currents I1 and I2 collectively have the effect of adding in-phase synthetic current information into the regulator for compensating for an aggressive output filter causing phase shift.

In an alternative configuration, the detection and compensation network 702 detects phase shift of VCOMP rather than VOUT. VCOMP at the output of the error amplifier of the controller represents an amplified version of the difference between VOUT and a reference voltage, such as VDAC, and thus also incorporates phase shift information. Operation of compensation based on detected phase shift is substantially the same.

Figure 8:
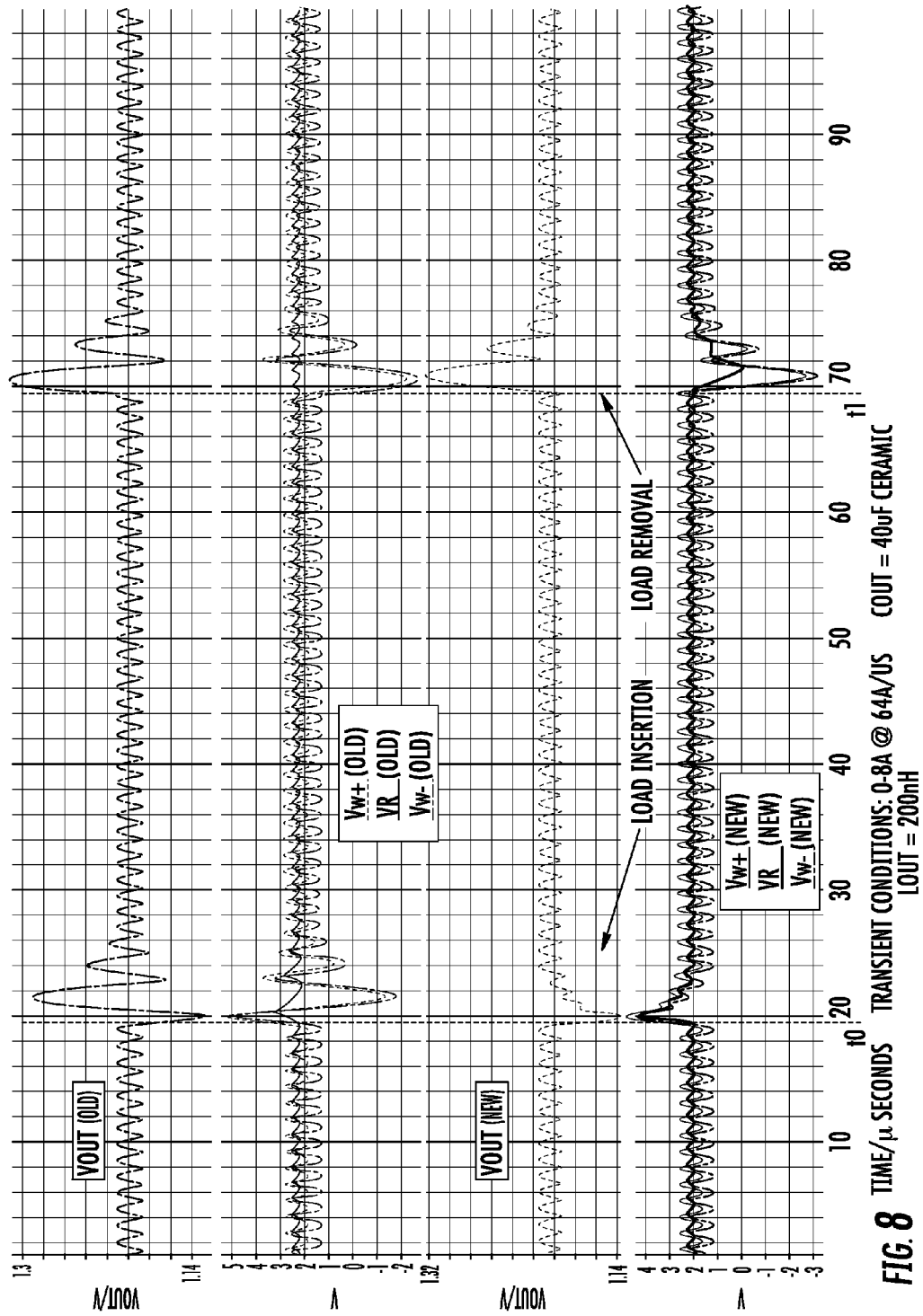
FIG. 8 is a graph diagram of a "before and after" transient simulation of the network of FIG. 7 used within a synthetic ripple regulator, such as the regulator of FIG. 4.

The effects of the detection and compensation network 702 are shown in FIG. 8, which is a graph diagram of "before and after" transient simulation of the network of FIG. 7 used within a synthetic ripple regulator, such as the regulator 400. In one embodiment the output filter is extremely aggressive at 200 nano-Henries (nH), 40 micro-Farads (µF) and <<1 milli-Ohm (mΩ) ESR for an 800 kHz switching frequency. Again, a load insertion transient occurs at about time t0 and a load removal transient occurs at a time t1. As can be seen in the top pair of VOUT traces of FIG. 8, the output voltage exhibits major ring-back and oscillation upon load insertion and removal for the conventional case without correction (e.g., "old"). When the detection and compensation network 702 is added as shown in the lower pair of VOUT traces, the output maintains good regulation with fast response. When the output filter is moved back to reasonable values, the transient behaves as if the detection and compensation network 702 was not present. This is further confirmed in the graphic diagram of FIG. 9.

Figure 9:
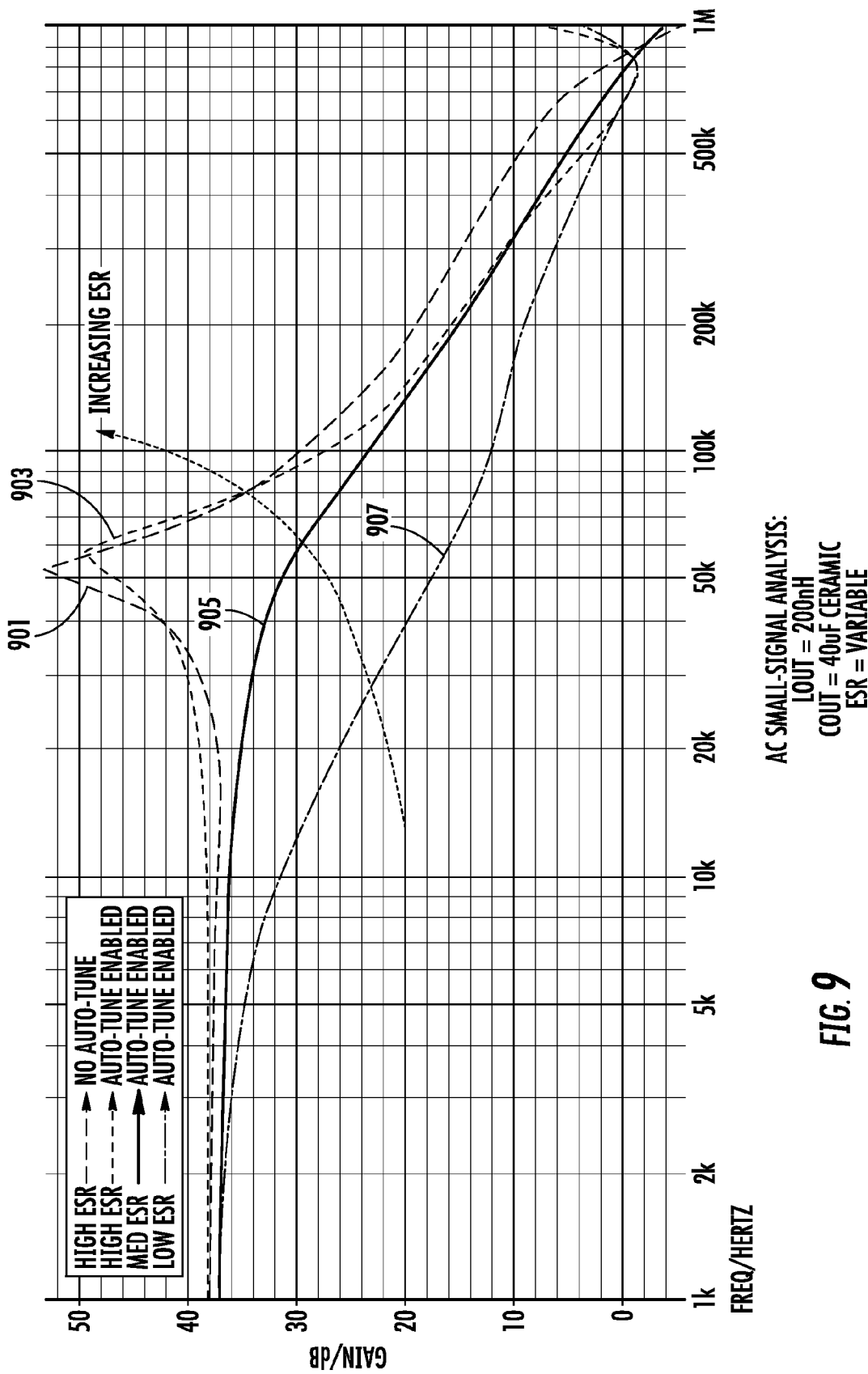
FIG. 9 is a graph diagram of a small-signal AC simulation of the implementation shown in FIG. 7 used within a synthetic ripple regulator, such as the regulator of FIG. 4.

FIG. 9 is a graph diagram of a small-signal AC simulation of the implementation shown in FIG. 7 used within a synthetic ripple regulator, such as the regulator 400. A first signal plot 901 shows the results of the normal case with high ESR (low aggressive output filter) without auto-tune enabled. In this case, the detection and compensation network 702 is either not provided or is otherwise disabled. A second signal plot 903 shows the results of the normal case with high ESR (low aggressive output filter) with auto-tune enabled. In this case, the detection and compensation network 702 is provided and active. A third signal plot 905 shows the results for medium ESR (more aggressive output filter) with auto-tune enabled. In this case, the detection and compensation network 702 is provided and active. A fourth signal plot 907 shows the results for low ESR (aggressive output filter) with auto-tune enabled. In this case, the detection and compensation network 702 is provided and active. It can be seen that when the ESR is high, the AC results are almost identical to the results when the detection and compensation network 702 is not provided or otherwise not active. As ESR was decreased, the AC results changed in response to the additional in-phase current information in the regulator as a result of operation of the detection and compensation network 702, which has the effect of splitting the inductive-capacitive (L-C) double pole.

Figure 10:
FIG. 10 is a block diagram of an alternative embodiment for phase lag detection based on compensation voltage rather than output voltage.

FIG. 10 is a block diagram of an alternative embodiment for phase lag detection. In this case, the detection network 408 monitors VCOMP rather than VOUT. As previously described for FIG. 7, VCOMP at the output of the error amplifier of the controller (e.g., at the output of the error amplifier 401) represents an amplified version of the difference between VOUT and a reference voltage, such as VDAC, and thus also incorporates phase shift information for certain configurations or embodiments as understood by those of ordinary skill in the art. The detection network 408 is implemented in substantially the same manner with any suitable modifications for sensing the phase shift of VCOMP rather than VOUT. For example, the voltage level of the offset voltage VOS may be adjusted accordingly. Sampling and holding a sampled voltage at an operative edge of the PWM signal is substantially similar to that described for VOUT.

Figure 11:
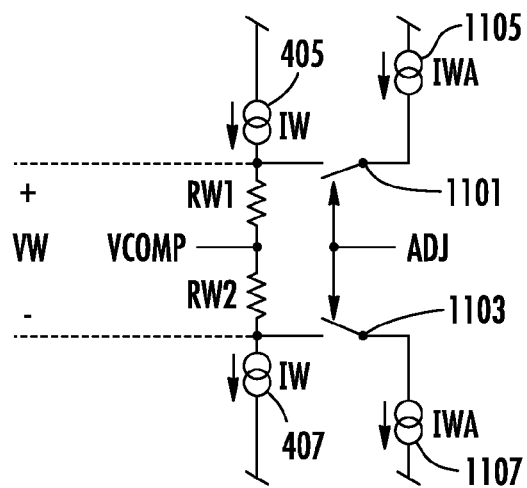
FIG. 11 is a schematic diagram illustrating an alternative digital compensation adjustment scheme for adjusting the window voltage rather than error amplifier gain in response to the adjust signal from the automatic compensation network of FIG. 4.

FIG. 11 is a schematic diagram illustrating an alternative digital compensation adjustment scheme for adjusting the window voltage VW rather than error amplifier gain in response to the ADJ signal from the detection network 408. The window network is shown substantially similar to that of the regulator 400 including the current devices 405 and 407 and the window resistors RW1 and RW2 centered on VCOMP. The compensation network in this case includes a pair of switches 1101 and 1103 coupled to another pair of current devices 1105 and 1107, respectively, for selectively adjusting current through the window resistors RW1 and RW2. The current devices 1105 and 1107 are configured to source/sink a window adjust current IWA. The switches 1101 and 1103 are normally open for the normal operating mode. When the ADJ signal is asserted upon detection of phase shift, the switches 1101 and 1103 are both closed so that the current IWA is added through the window resistors RW1 and RW2 thereby adjusting the window voltage VW.

Although not specifically shown, a corresponding alternative analog compensation adjustment scheme for adjusting the window voltage VW is contemplated similar to the detection and compensation network 702 of FIG. 7. The current devices 1105 and 1107 and the switches 1101 and 1103 are replaced by the detection and compensation network 702 and current adjust devices (not shown). The adjust currents I1 and I2 are summed together to provide an adjustment current which is mirrored on both sides of the resistors RW1 and RW2 by the adjust devices to maintain the balanced window configuration. The adjust devices may include current mirrors or the like.

Figure 12:
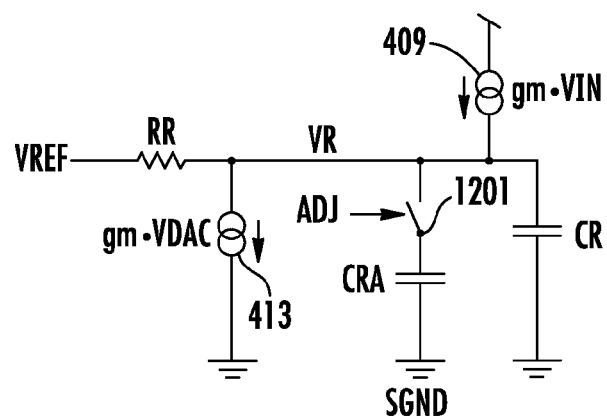
FIG. 12 is a schematic diagram illustrating an alternative digital compensation adjustment scheme for adjusting the ripple capacitance of a synthetic ripple regulator rather than error amplifier gain in response to the adjust signal from the automatic compensation network of FIG. 4.

FIG. 12 is a schematic diagram illustrating an alternative digital compensation adjustment scheme for adjusting the ripple capacitance of a synthetic ripple regulator rather than error amplifier gain in response to the ADJ signal from the detection network 402. The current devices 409 and 413, the ripple resistor RR and the ripple capacitor CR are provided and coupled in substantially the same manner as described for the regulator 400. A switch 1201 coupled in series with an adjustment capacitor CRA is added between the ripple voltage node and SGND. Thus, when the ADJ signal is asserted, the switch 1201 is closed and the total ripple capacitance is modified accordingly (e.g., ripple capacitance is increased to reduce slope of voltage ramps).

Other compensation methods may include, but are not limited to, adjusting the window resistors RW1 and RW2, adjusting the modulator transconductance (gm) of the current devices 409 and 413 at the ripple node, and/or a combination of any of the methods discussed herein.

Although the present invention has been described in considerable detail with reference to certain preferred versions thereof, other versions and variations are possible and contemplated. For example, only a few examples are illustrated of how to implement this detection and compensation for aggressive output filters for switched mode power supplies (in which "power supplies" are also generally referred to as, or otherwise include, regulators or converters or modulators or the like). The system and method of detection and compensation may be adapted easily to any hysteretic topology in a number of analog and digital ways. Those skilled in the art should appreciate that they can readily use the disclosed conception and specific embodiments as a basis for designing or modifying other structures for providing out the same purposes of the present invention without departing from the spirit and scope of the invention as defined by the following claim(s).

The invention claimed is:

1. A controller for a switched mode power supply converting an input voltage to a regulated output voltage, said controller comprising:
    a control network which is configured to develop a pulse width control signal for regulating a level of the output voltage, wherein said control network comprises a synthetic ripple regulator network including a ripple capacitance coupled to a ripple node which develops a ripple voltage; and
    a detection network which is configured to detect a phase lag of the output voltage and which is configured to adjust operation of said control network based on said phase lag including adjusting said ripple voltage based on said phase lag.

2. The controller of claim 1, wherein said control network comprises an error amplifier and wherein said detection network modifies a gain of said error amplifier based on said phase lag.

3. The controller of claim 1, wherein said control network comprises an error amplifier and wherein said detection network adds slope compensation to a reference provided to an input of said error amplifier based on said phase lag.

4. The controller of claim 1, wherein said control network comprises a hysteretic window network having a window voltage and wherein said detection network is configured to modify said window voltage based on said phase lag.

5. The controller of claim 1, wherein said detection network is configured to modify said ripple capacitance based on said phase lag.

6. The controller of claim 1, wherein said detection network comprises a transconductance network which is configured to adjust current provided to said ripple capacitance based on a level of said phase lag.

7. The controller of claim 6, wherein said transconductance network comprises:
    a first sample and hold network which samples the output voltage at a first operative edge of said pulse width control signal and which provides a first sampled voltage;
    a first transconductance amplifier having a first input receiving the output voltage, having a second input receiving said first sampled voltage, and having an output coupled providing a first adjust current to said ripple node;
    a second sample and hold network which samples the output voltage at a second operative edge of said pulse width control signal and which provides a second sampled voltage; and
    a second transconductance amplifier having a first input receiving the output voltage, having a second input receiving said second sampled voltage, and having an output providing a second adjust current coupled to said ripple node.

8. The controller of claim 1, wherein said detection network comprises:
    a sample and hold module which samples the output voltage at an operative edge of said pulse width control signal and which provides a sampled voltage;
    an offset voltage source having an input receiving said sampled voltage and having an output providing a threshold voltage; and
    a comparator having a first input receiving the output voltage, having a second input receiving said threshold voltage, and having an output providing an adjust indication for adjusting operation of said control network based on said phase lag.

9. The controller of claim 1, wherein:
said controller network comprises an error amplifier having an output providing a compensation voltage indicative of output voltage error; and
wherein said detection network detects said phase lag using said compensation voltage.

10. A switched mode power supply, comprising:
a switching network which is configured to convert an input voltage to a regulated output voltage based on a pulse width control signal;
a regulation network which is configured to receive a feedback voltage indicative of said output voltage and which is configured to generate said pulse width control signal to regulate a level of said output voltage;
wherein said regulation network comprises a synthetic ripple regulator which is configured to simulate ripple current through an output inductor by converting voltage applied across the output inductor into a proportional current applied to a ripple capacitance to develop a ripple voltage; and
a compensation network which is configured to measure a phase shift of said output voltage and which is configured to adjust compensation of said regulation network based on an amount of said phase shift including adjusting said ripple voltage based on an amount of said phase shift.

11. The switched mode power supply of claim 10, wherein said compensation network adjusts compensation of said regulation network when said phase shift exceeds a predetermined amount.

12. The switched mode power supply of claim 10, wherein said compensation network adjusts compensation of said regulation network by adjusting a gain of said regulation network.

13. The switched mode power supply of claim 10, wherein said compensation network adjusts compensation of said regulation network by combining slope compensation into said regulation network.

14. The switched mode power supply of claim 10, wherein said regulation network comprises a hysteretic window voltage and wherein said compensation network tunes compensation of said regulation network by adjusting said hysteretic window voltage.

15. The switched mode power supply of claim 10, wherein said compensation network adjusts compensation of said regulation network by adjusting said proportional current.

16. The switched mode power supply of claim 10, wherein said compensation network adjusts compensation of said regulation network by adjusting said ripple capacitance.

17. A method of automatically adjusting compensation of a switched mode power supply which is operative to convert an input voltage to a regulated output voltage, said method comprising:
generating a pulse width control signal to regulate the level of the output voltage using loop control which comprises simulating ripple current through an output inductor by converting voltage applied across the output inductor into a proportional current applied to a ripple capacitance to develop a ripple voltage;
detecting a phase lag of the output voltage; and
adjusting at least one operating characteristic of the loop control based on the amount of the phase lag including adjusting the ripple voltage.

18. The method of claim 17, wherein said detecting a phase lag comprises:
sampling the output voltage at an operative edge of the pulse with control signal and providing a sampled voltage; and
comparing the sampled voltage with the output voltage.

19. The method of claim 17, wherein said adjusting at least one operating characteristic of the loop control comprises modifying a gain of the loop control.

20. The method of claim 17, wherein said using loop control comprises comparing the output voltage with a reference voltage, and wherein said adjusting comprises adding slope compensation to the reference voltage.

21. The method of claim 17, wherein said using loop control comprises using a hysteretic window voltage and wherein said adjusting at least one operating characteristic of the loop control comprises adjusting the hysteretic window voltage.

22. The method of claim 17, wherein said adjusting at least one operating characteristic of the loop control comprises adjusting the proportional current.

23. The method of claim 17, wherein said adjusting at least one operating characteristic of the loop control comprises adjusting the ripple capacitance.

24. A controller for a switched mode power supply converting an input voltage to a regulated output voltage, said controller comprising:
a control network which is configured to develop a pulse width control signal for regulating a level of the output voltage, wherein said control network includes an error amplifier; and
a detection network which is configured to detect a phase lag of the output voltage and which is configured to adjust operation of said control network based on said phase lag by adding slope compensation to a reference provided to an input of said error amplifier.

25. A controller for a switched mode power supply converting an input voltage to a regulated output voltage, said controller comprising:
a control network which is configured to develop a pulse width control signal for regulating a level of the output voltage, wherein said control network comprises a hysteretic window network having a window voltage; and
a detection network which is configured to detect a phase lag of the output voltage and which is configured to adjust operation of said control network based on said phase lag by modifying said window voltage.

* * * * *